(12) United States Patent
Parikh

(10) Patent No.: US 10,068,263 B2
(45) Date of Patent: Sep. 4, 2018

(54) ADAPTIVE POWER MANAGEMENT OF A CLUSTER OF HOST COMPUTERS USING PREDICTED DATA

(71) Applicant: VMware, Inc., Palo Alto, CA (US)

(72) Inventor: Aashish Parikh, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 154 days.

(21) Appl. No.: 14/332,693

(22) Filed: Jul. 16, 2014

(65) Prior Publication Data
US 2015/0058641 A1  Feb. 26, 2015

Related U.S. Application Data

(60) Provisional application No. 61/869,679, filed on Aug. 24, 2013.

(51) Int. Cl.
| | |
|---|---|
| G06Q 30/02 | (2012.01) |
| G06F 9/50 | (2006.01) |
| G06F 11/30 | (2006.01) |
| G06F 1/32 | (2006.01) |
| H04L 29/08 | (2006.01) |
| G06F 1/26 | (2006.01) |
| G06Q 50/06 | (2012.01) |
| H04L 29/06 | (2006.01) |

(52) U.S. Cl.
CPC .......... *G06Q 30/0283* (2013.01); *G06F 1/26* (2013.01); *G06F 1/3209* (2013.01); *G06F 9/5094* (2013.01); *G06F 11/3062* (2013.01); *G06Q 50/06* (2013.01); *H04L 67/1002* (2013.01); *H04L 67/1097* (2013.01); *H04L 67/42* (2013.01); *Y02B 60/142* (2013.01); *Y02D 10/22* (2018.01)

(58) Field of Classification Search
CPC ...... G06F 11/3062; G06F 1/26; G06F 1/3209; G06F 9/5094; G06F 1/3206; G06F 1/3203; G06F 1/329; G06F 9/5027; G06Q 30/0283; H04L 67/1002; H04L 67/1097; H04L 67/42; H06L 67/1002; H06L 67/1097; H06L 67/42
See application file for complete search history.

(56) References Cited

U.S. PATENT DOCUMENTS

| | | | |
|---|---|---|---|
| 6,230,114 B1 | 5/2001 | Hellestrand | |
| 7,958,058 B2 | 6/2011 | Man | |
| 8,260,840 B1 | 9/2012 | Sirota | |
| 9,116,803 B1 | 8/2015 | Agrawal | |
| 2005/0071843 A1 | 3/2005 | Guo | |
| 2008/0320482 A1* | 12/2008 | Dawson | G06F 9/5027 718/104 |

(Continued)

OTHER PUBLICATIONS

Office Action dated May 21, 2018 for U.S. Appl. No. 14/249,267.

*Primary Examiner* — Terrell Johnson
(74) *Attorney, Agent, or Firm* — Thomas | Horstemeyer, LLP

(57) ABSTRACT

A power management system and method for performing power management operations in a distributed computer system uses predicted resource demands for a specified time in the future to change a power management option of a power management analysis algorithm prior to the specified time so that the power management analysis algorithm can be executed in anticipation of the predicted resource demands at the specified time.

24 Claims, 4 Drawing Sheets

(56) References Cited

U.S. PATENT DOCUMENTS

| | | | |
|---|---|---|---|
| 2009/0300173 A1 | 12/2009 | Bakman et al. | |
| 2010/0005173 A1* | 1/2010 | Baskaran | G06F 15/16 |
| | | | 709/226 |
| 2010/0070784 A1* | 3/2010 | Gupta | G06F 1/3203 |
| | | | 713/310 |
| 2012/0042312 A1* | 2/2012 | Isci | G06F 1/3203 |
| | | | 718/1 |
| 2012/0053925 A1* | 3/2012 | Geffin | G06F 1/3206 |
| | | | 703/21 |
| 2012/0131176 A1 | 5/2012 | Ferris | |
| 2012/0278800 A1 | 11/2012 | Nicholas | |
| 2013/0073730 A1 | 3/2013 | Hansson | |
| 2013/0227558 A1 | 8/2013 | Du | |
| 2013/0339201 A1 | 12/2013 | Banerjee | |
| 2013/0346972 A1 | 12/2013 | Anand | |
| 2014/0019966 A1 | 1/2014 | Neuse | |
| 2015/0067357 A1* | 3/2015 | Arora | G06F 1/3206 |
| | | | 713/300 |

* cited by examiner

ADAPTIVE POWER MANAGEMENT OF A CLUSTER OF HOST COMPUTERS USING PREDICTED DATA

CROSS REFERENCE TO RELATED APPLICATION

This application is entitled to the benefit of U.S. Provisional Patent Application Ser. No. 61/869,679, filed on Aug. 24, 2013, which is incorporated herein by reference.

BACKGROUND

Sharing resources in a networked computer system, such as processors, computer memories, network bandwidth and data storage facilities, among clients, e.g., virtual machines (VMs), running on the system can increase efficiency by reducing maintenance and operating costs, allowing flexibility with respect to individual resource usage, and simplifying resource management. With respect to shared storage, the benefits include data consolidation, universal access to data, ease of storage management, and support for live migration of virtualized environments.

In order to further reduce the operating cost of the networked computer system, a power management technique may be used to minimize power consumption of host computers running on the networked computer system during periods of low resource utilization. This can be achieved by selectively migrating clients onto fewer host computers during periods of low resource utilization and powering off the unneeded host computers, i.e., the host computers without any clients in operation. However, since load conditions can change suddenly over time, it may be difficult to make the appropriate decisions regarding client migration and powering-down the unneeded host computers.

SUMMARY

A power management system and method for performing power management operations in a distributed computer system uses predicted resource demands for a specified time in the future to change a power management option of a power management analysis algorithm prior to the specified time so that the power management analysis algorithm can be executed in anticipation of the predicted resource demands at the specified time. Thus, power management operations can be executed for the distributed computer system in a more efficient manner.

A method for performing power management operations in a distributed computer system in accordance with an embodiment of the invention comprises analyzing resource demands of clients running in the distributed computer system to produce predicted resource demands for a specified time in the future, changing a power management option of a power management analysis algorithm from a first option setting to a second option setting at a first time prior to the specified time, and executing the power management analysis algorithm with the second option setting in anticipation of the predicted resource demands at the specified time. In some embodiments, the steps of this method are performed when program instructions contained in a computer-readable storage medium are executed by one or more processors.

A power management system supported by hardware in a distributed computer system in accordance with an embodiment of the invention comprises an analytics engine configured to analyze resource demands of clients running in the distributed computer system to produce predicted resource demands for a specified time in the future, an option setting unit configured to change a power management option of a power management analysis algorithm from a first option setting to a second option setting at a first time prior to the specified time, and a power management engine configured to execute the power management analysis algorithm with the second option setting in anticipation of the predicted resource demands at the specified time.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
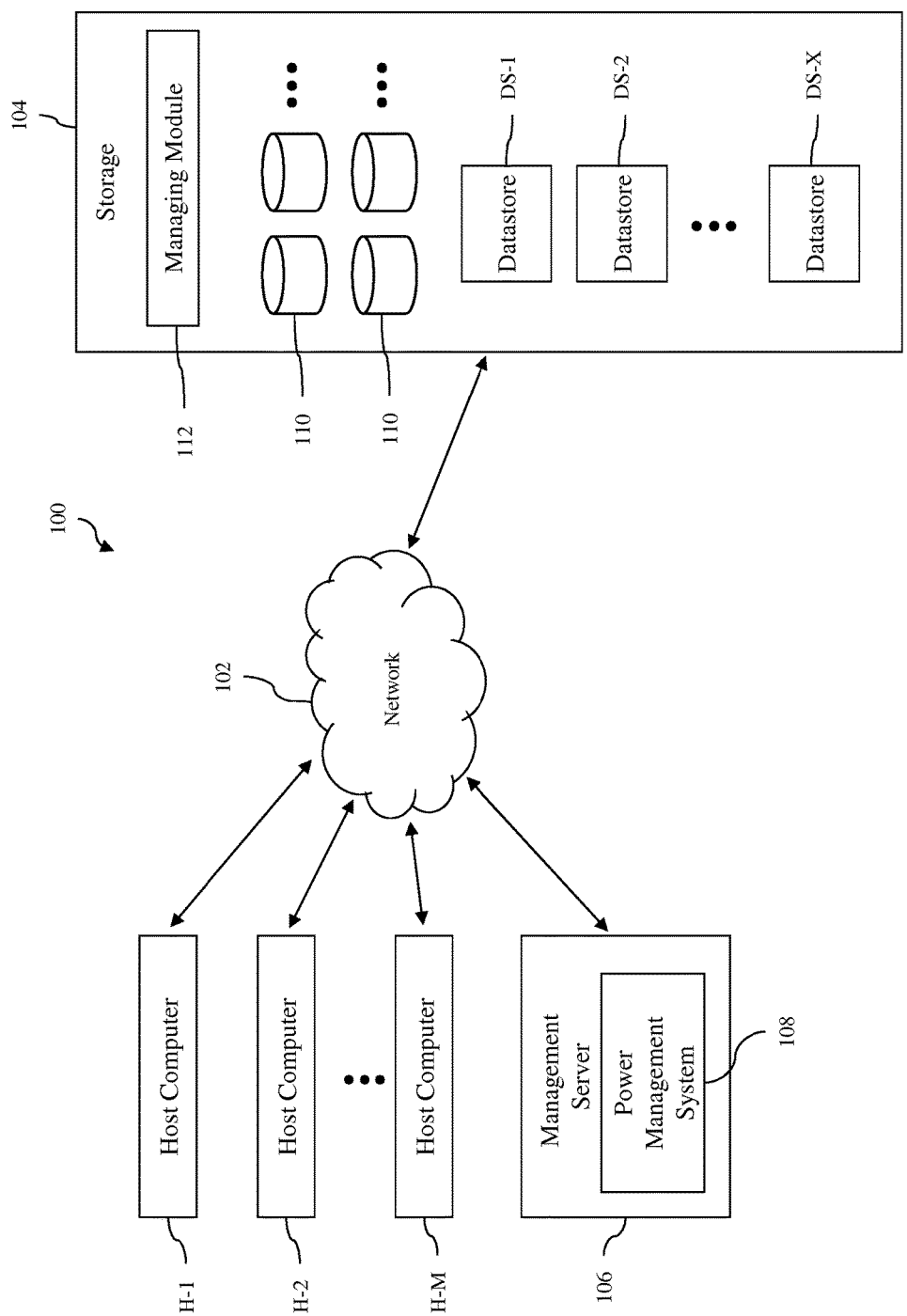
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, a cluster of host computers H-1, H-2 . . . H-M (where M is a positive integer), storage 104 and a management server 106 with a power management system 108. The host computers, the storage and the management server are connected to the network. Thus, each of the host computers is able to access the storage via the network and may share the resources provided by the storage with the other host computers. Consequently, any process running on any of the host computers may also access the storage via the network.

The host computers H-1, H-2 . . . H-M are physical computer systems that hosts or supports one or more clients so that the clients are executing on the physical computer systems. As used herein, the term "client" is any software entity that can run on a computer system, such as a software application, a software process or a virtual machine (VM). The host computers may be servers that are commonly found in datacenters. As an example, the host computers may be servers installed in a single server rack. However, in other embodiments, the host computers may be installed in multiple server racks in the same or different facilities.

Figure 2:
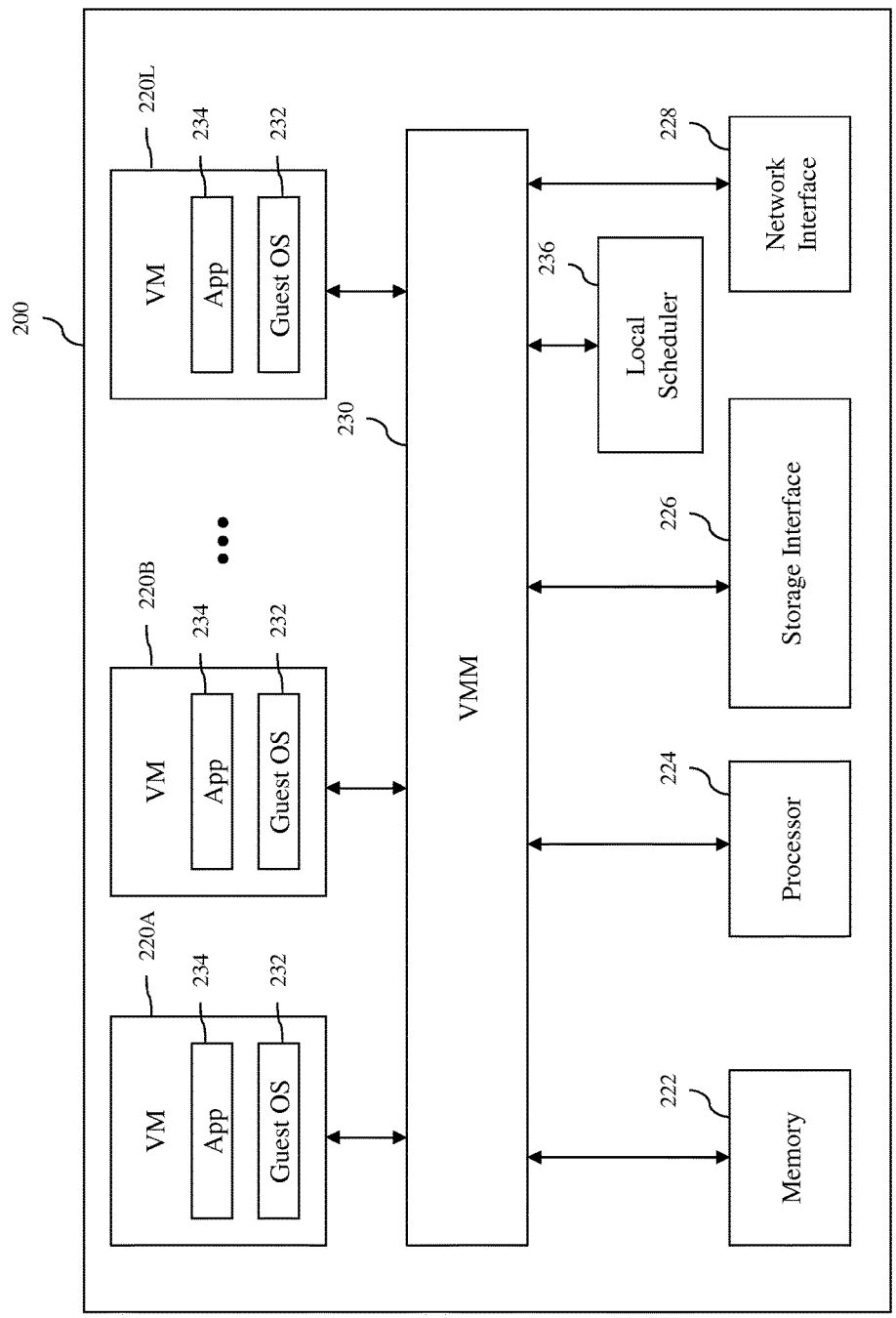
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 222, one or more processors 224, a storage interface 226, and a network interface 228. Each system memory 222, which may be random access memory (RAM), is the volatile memory of the host computer. Each processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 232 and one or more guest applications 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local scheduler 236 that operates as part of a resource management system, such as VMware Distributed Resource Scheduler (DRS), to manage resource requests made by the VMs 220A, 220B . . . 220L. Although the local scheduler is illustrated in FIG. 2 as being separate from the virtual machine monitor 230, the local scheduler may be implemented as part of the virtual machine monitor. In some embodiments, the local scheduler is implemented as software programs running on the host computer. However, in other embodiments, the local scheduler may be implemented using any combination of software and hardware.

Turing back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M of the cluster, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the cluster. For virtual machines, the datastores may be used to store virtual storage, e.g., virtual disks, used by each of the virtual machines, as well as other files needed to support the virtual machines.

The management server 106 operates to monitor and manage the host computers H-1, H-2 . . . H-M in cluster. The management server may be configured to monitor the current configurations of the host computers and the clients running on the host computers, for example, virtual machines (VMs). The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the management server.

The management server 106 may also perform operations to manage the clients and the host computers H-1, H-2 . . . H-M in the cluster. As illustrated in FIG. 1, in an embodiment, the cluster management server includes the power management system 108, which can be enabled by a user, to perform power management operations for the cluster. In particular, the power management system manages the power-on resource capacity of the cluster to ensure that clients running on the cluster are able to perform at desired levels, e.g. Service Level Objectives (SLOs). During periods of low resource demands, the power management system may reduce the cluster power-on resource capacity by powering down one or more host computers to conserve power, which may include consolidating the clients running in the cluster into fewer host computers so that the unneeded host computers can be powered down. Powering down an unneeded host computer involves switching the unneeded host computer to standby mode or completely shutting down the unneeded host computer. During periods of high resource demands, the power management system may increase the cluster power-on resource capacity by powering on one or more "powered down" host computers and migrating some of the clients running on the cluster into the newly powered on host computers. Powering on a host computer involves making the host computer come out of standby mode or turning on a completely powered down host computer. As described in more detail below, the power management system operates to adaptively adjust the power management operations being performed using predicted resource demand data to better meet resource demands of the clients due to load condition changes.

In some embodiments, the management server 106 may be a physical computer, and thus, includes memory and one or more processors, as well as other components commonly found in a computer system. In other embodiments, the management server may be implemented as one or more software programs running on one or more physical computers, such as the host computer 200 shown in FIG. 2, or virtual computers, such as the 220A, 220B . . . 220L. In an implementation, the management server is a VMware vCenter™ server with at least some of the features available for such a server, and some or all of the components of the power management system 108 may be incorporated into VMware Distributed Resource Scheduler (DRS) as Distributed Power Management (DPM).

Figure 3:
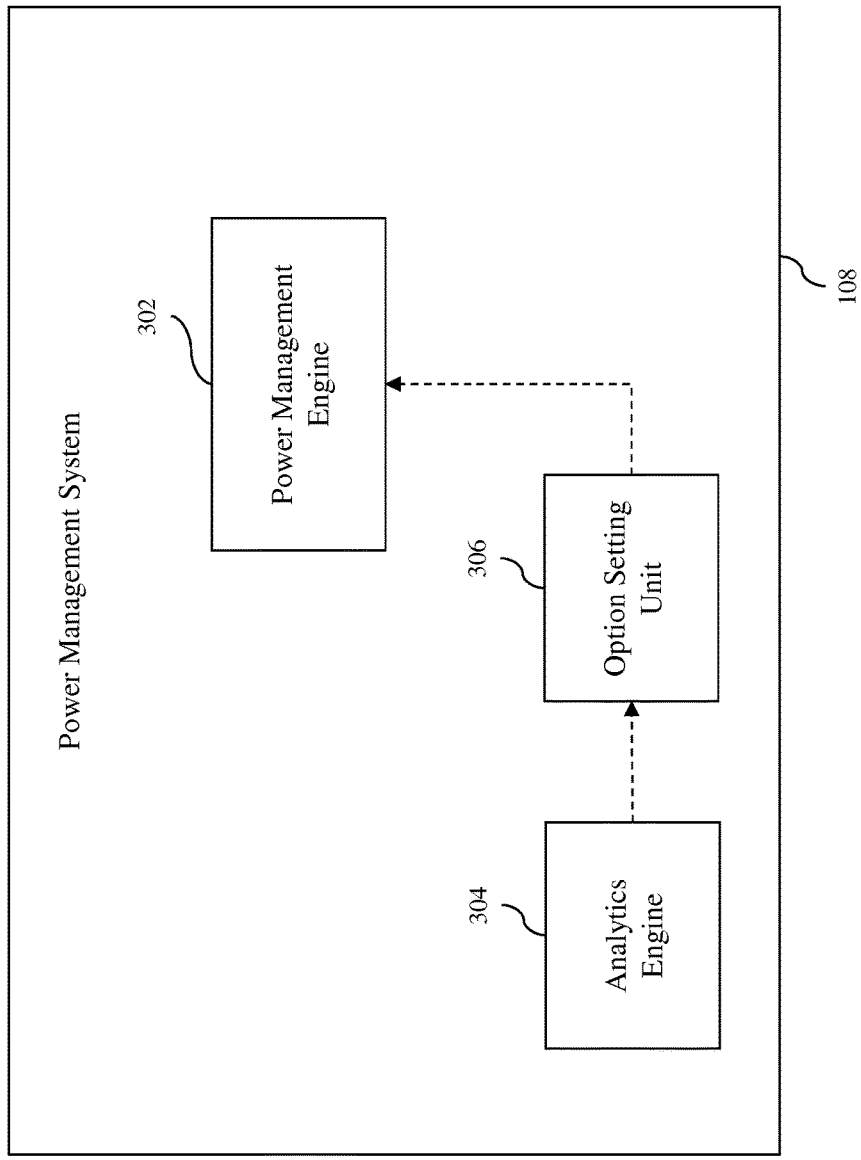
FIG. 3 is a block diagram of a power management system included in the distributed computer system in accordance with an embodiment of the invention.

Turning now to FIG. 3, components of the power management system 108 in accordance with an embodiment of the invention are shown. As illustrated in FIG. 3, the power management system includes a power management engine 302, an analytics engine 304 and an option setting unit 306. The components of the power management system may be implemented in any combination of hardware, software and firmware. In one implementation, these components of the power management system are implemented as one or more software programs running in the management server 106 using one or more processors associated with or installed in the management server. In other implementations, these components of the power management system are implemented as one or more software programs running on different devices in the distributed computer system 100 using one or more processors associated with or installed in the different devices.

The power management engine 302 of the power management system 108 executes a power management analysis algorithm to make recommendations to manage power consumption by the host computers H-1, H-2 . . . H-M in the cluster. During periods of low resource demands by the clients running in the cluster, the power management engine may recommend powering down one or more host computers in the cluster to reduce power consumption of the host computers running in the cluster. In particular, the power management engine may recommend consolidating the clients running in the cluster into fewer host computers by migrating one or more clients to other host computers so that one or more individual host computers that are not hosting any clients, which are referred to herein as "unneeded" host computers, can be powered down. As noted above, powering down a host computer may be switching the host computer from a normal operating mode to a standby mode or completely shutting down the host computer. During periods of high resource demands by the clients running in the cluster, the power management engine may recommend powering on one or more of the previous "unneeded" host computers to increase the resources available in the cluster. In particular, the power management engine may recommend distributing the clients among the powered-on host computers, including the newly powered-on host computers, by migrating one or more clients from their original host computers to the newly powered-on host computers so that the clients have access to more resources from their host computers. As noted above, powering on a host computer may be switching the host computer from the standby mode to the normal operating mode or turning on the host computer, which was completely turned off. In some embodiments, the power management analysis algorithm executed by the power management engine may be any versions of a power management analysis algorithm used by VMware DPM.

In an embodiment, the power management engine 302 includes a number of options that may be set to cause the power management engine to use different levels of aggressiveness when performing power management analyses to make the power management recommendations. These power management options may be parameters of the power management analysis algorithm that affect the computations and calculations performed by the algorithm, including the amount of data and/or thresholds to be used in those computations and calculations. These power management options of the power management engine may be set manually by a user of the management server 106 or may be set automatically by one or more devices or programs that can communicate with the power management engine, in particular, the option setting unit 306. These power management options may affect the aggressiveness of the power management engine to move the clients in the cluster or to shut down one or more host computers in the cluster. Thus, if the settings or values of at least some of these power management options are set to be conservative, then the power management engine may be better able to handle significant increases in resource demands of the clients running in the cluster. Conversely, if the settings or values of at least some of these options are set to be aggressive, then the power management engine may be able to achieve significant power savings, but may not be able to efficiently handle significant increases in resource demands of the clients. These power management options may include, but not limited to, options related to resources utilized by clients running in each of the host computers in the cluster, options for aggressiveness of power management analysis, options for the amount of historical resource demand data to consider for power management analysis, options related to cost-benefit analysis for power management analysis and options for minimum amount of resources to maintain for powered-on host computers. The following are examples of the power management options in an embodiment in which the clients running in the cluster are VMs.

Average host utilization in the cluster (This option may be provided as a percentage, for example: "60%+/−10%".)

Power management aggressiveness threshold (This option may be provided as a star rating between 1 and 5.)

VmDemandHistorySecsHostOn (This option defines how long should VM demand history be observed before making host power-on decisions?)

VmDemandHistorySecsHostOff (This option defines how long should VM demand history be observed before making host power-off decisions?)

VmDemandHistoryNumStdDevAboveAve (This option is used to decide how aggressively the demand for the period of observation must be computed.)

EnablePowerPerformance (This option defines whether or not to perform advanced cost-benefit analysis while making power management analysis.)

PowerPerformanceHistorySecs (This option defines how long should VM demand history be observed and those observations used while performing power management cost-benefit analyses?)

PowerPerformanceVmDemandHistoryNumStdDev (This option is used to decide how aggressively the demand for the period of observation must be computed for power management cost-benefit analyses.)

MinPoweredOnCpuCapacity (This option defines the minimum compute capacity—measured in MHz—that must be kept available through all the powered-on host computers, i.e., host computers in the cluster that are not in standby mode. This provides a floor below which the powered-on compute capacity will not be allowed to fall in the cluster.)

MinPoweredOnMemCapacity (This option defines the minimum memory capacity—measured in MB—that must be kept available through all the powered-on host computers, i.e., host computers in the cluster that are not in standby mode. This provides a floor below which the powered-on memory capacity will not be allowed to fall in the cluster.)

HostsMinUptimeSecs (This option defines the minimum number of seconds a host computer must remain powered-on before it is considered a candidate for being put into standby mode.)

As described in more detail below, the power management options of the power management engine 302 are adjusted or set in a predictive and adaptive manner so that the power management engine can make power management recommendations more effectively. Once the power management recommendations are made, for example, migrating clients to different host computers, and powering down or powering on host computers, these recommendations may be automatically implemented by other components in the management server 106 or by other components in the distributed computer system. Alternatively, the recommendations may be presented to an administrator who may manually implement some or all of the recommendations.

The analytics engine 304 of the power management system 108 operates to monitor resource demands of the clients running in the cluster and generate predicted resource demand data of the clients for a predefined period of time, e.g., a 24-hour cycle. The analytics engine receives various metrics regarding the clients running on the host computers H-1, H-2 . . . H-M in the cluster, which are processed by the analytics engine to predict future metrics. As an example, the analytics engine may receive processor (e.g., CPU) and/or memory demands for the clients running on each of the host computers in the cluster. These metrics may be provided to the analytics engine by the host computers, e.g., the VMMs of the host computers. These predicted resource demands may be generated by the analytics engine in the form of predicted resource demand values, where each predicted resource demand value may be tagged with the particular resource being predicted and a specified moment of time in the future (e.g., the hour in a 24-hour cycle).

The analytics engine 304 may generate, for each resource being considered, e.g., memory and processor resources, predicted resource demand values for each of the host computers H-1, H-2 . . . H-M in the cluster for certain times during the predefined period of time, such as every minute or every five minute of the 24-hour cycle. Thus, for each resource being considered and for each host computer, the analytics engine may generate two hundred eighty eight (288) predicted resource demand values for a 24-hour cycle if a predicted resource demand value is generated for every five minutes. In an embodiment, this predicted resource demand value may be the total predicted resource demand value for all the clients running on a host computer in the cluster, i.e., the sum of predicted resource demand values for all the different clients running on the host computer. In another embodiment, the predicted resource demand value may be an average predicted resource demand value for all the clients running on a host computer in the cluster. In other embodiments, this predicted resource demand value can be any predicted value related to the overall resource demand of the clients running on a host computer.

The analytics engine 304 may periodically update the predicted resource demand data so that the most current predicted resource demand data is available for use. The analytics engine may continuously update the predicted resource demand data by taking into consideration all the accumulated resource demand information and new resource demand information. Alternatively, the analytics engine may periodically update the predicted resource demand data using observed resource demand data for a sliding period of time in the immediate past, e.g., past six months or past six weeks.

By monitoring and analyzing historical resource demands of the clients in the cluster, the analytics engine 304 can predict resource demands based on time, such as the month, the week, the day of the week and/or the time of the day. For example, if the clients running on the cluster remain almost idle between 7 pm and 9 am everyday (i.e., a 24-hour cycle), the analytics engine could observe such a pattern and predict near-zero values for processor and/or memory demand metrics for the clients during this time period (i.e., 7 pm to 9 am) for future daily cycles.

Although the analytics engine 304 is illustrated in FIG. 3 as being part of the power management system 108 in the management server 106, in other embodiments, the analytics engine may be another component of the management server or even another component external to the management server. In an embodiment, the analytics engine is a VMware Operations Manager running in a VMware vCenter™ server in the distributed computer system 100.

The option setting unit 306 of the power management system 108 operates to automatically adjust or set one or more power management options of the power management engine 302. The option setting unit uses the predicted resource demand data produced by the analytics engine 304 to determine whether there is a need to change one or more options of the power management engine. The option setting unit may use one or more thresholds for the predicted resource demand data to determine whether there is a need to change one or more options of the power management engine. The thresholds may be used to determine different levels of aggressiveness for the power management engine. As an example, in anticipation of a decrease in resource demand, the option setting unit may change an average host utilization option from a conservative setting of 60%+/−10% (which may be the default setting) to the most aggressive setting of 90%+/−10% and/or change an aggressive threshold option from a conservative setting of 1 (which may be the default setting) to an aggressive setting of 5 (which may be the maximum value). Conversely, in anticipation of an increase in resource demand, the option setting unit may change the average host utilization option from the most aggressive setting of 90%+/−10 back to the conservative setting of 60%+/−10% and/or change the aggressive threshold option from the aggressive setting of 5 to the conservative setting of 1. In an embodiment, the option setting unit may override any option setting change due to predicted resource demands when the actual resource demands warrant a different option setting change.

The option setting unit 306 may change one or more power management options of the power management engine 302 for a particular period of time at any time in anticipation of the predicted or expected resource demands for that period of time. In an embodiment, the option setting unit may gradually change one or more power management options prior to a particular period of time so that the aggressiveness of the power management engine is gradually adjusted to accommodate the expected resource demands during that period of time. If high resource demands are expected for a particular period of time in the near future, then the option setting unit may gradually change one or more power management options to more conservative settings before that period of time so that the aggressiveness of the power management engine is gradually reduced to accommodate the expected high resource demands during that period of time. Similarly, if low resource demands are expected for a particular period of time in the near future, then the option setting unit may gradually change one or more power management options to more aggressive settings before that period of time so that the aggressiveness of the power management engine is gradually increased to accommodate the expected low resource demands during that period of time. The gradual change of one or more power management options of the power management engine by the option setting unit may begin at any predetermined time prior to a particular period of time, such as few hours or minutes before the beginning of that particular period of time. After the initial option setting change, the option setting unit may execute subsequent option setting changes at any time interval. The subsequent option setting changes may occur at fixed intervals, such as every 30 minutes, and/or at varying intervals, such as intervals that can be anywhere between 1 minute to 60 minutes. In an embodiment, the amount of option setting changes may be increased as the particular period of time for the expected load change nears. For example, if high load is expected at 9 am, a change in a particular option setting at 6 am may be from a setting of "20" to "18", a change in the particular option setting at 7 am may be from a setting of "18" to "14", and a change in the particular option setting at 8 am may be from a setting of "14" to "6".

The setting of a power management option may involve transmitting a control message with an identifier for the option and the corresponding option setting value to the power management engine 302 from the option setting unit 306 using any suitable protocol. Alternatively, the setting of a power management option may involve changing a stored value corresponding to the option in one or more computer files stored in a storage device accessible by the power management engine. After one or more power management options have been changed, the power management engine executes the power management analysis algorithm using all the options, including any options that have been changed by the option setting unit, and the aggressiveness of the power management analysis algorithm will depend on the current options that are used by the power management engine. In some embodiments, the option setting unit may set all the power management options of the power management engine, including any option that has been changed. In other embodiments, the option setting unit may only set the power management options that are to be changed.

The operation of the power management system 108 in accordance with an embodiment of the invention will now be described using an example in which the clients running in the cluster remain almost idle every day (in a 24-hour cycle) during the hours of 7 PM to 9 AM, but the clients are heavily consuming resources during the hours of 9 AM to 7 PM. In this example, what this means is that the load on the clients during the hours of 7 PM to 9 AM is very low, but the load on the clients during the hours of 9 AM to 7 PM is very high.

The analytics engine 304 of the power management system 108 monitors resource demands of the clients in the cluster and generates predicted resource demand data of the clients for a 24-hour cycle. This monitoring process may be for any defined period of time, such as several days, weeks or months. In this example in which the load on the clients in the cluster is high during the hours of 9 AM to 7 PM and low during the hours of 7 PM to 9 AM in a 24-hour cycle, the analytics engine will generate low predicted resource demand values for the period of 7 PM to 9 AM (e.g., near-zero values) and high predicted resource demand values for the period of 9 AM to 7 PM.

Using the predicted resource demand values generated by the analytics engine 304, the option setting unit 306 will modify one or more power management options settings for the power management engine 302 at certain times during a 24-hour cycle to meet the expected load on the clients in the cluster, which will then be used by the power management engine to execute the power management analysis. Below is a table that illustrates the option setting changes initiated by the option setting unit during a 24-hour cycle.

| Time | Host Utilization Option | Other Power Management Options |
| --- | --- | --- |
| 7:00 PM | 60% | conservative values (e.g., default) |
| ... | | |
| 8:00 PM | 90% | highest aggressive values |
| ... | | |
| 9:00 PM | 90% | highest aggressive values |
| ... | | |
| 6:00 AM | 90% | highest aggressive values |
| ... | | |
| 6:30 AM | 80% | high aggressive values |
| ... | | |
| 7:00 AM | 70% | medium aggressive values |
| ... | | |
| 7:30 AM | 70% | low aggressive values |
| ... | | |
| 8:00 AM | 60% | conservative values (e.g., default) |
| ... | | |
| 9:00 AM | 60% | conservative values (e.g., default) |
| ... | | |
| 7:00 PM | 60% | conservative values (e.g., default) |

As shown in the above table, at 7:00 PM, the load is still expected to be high, and thus, the average host utilization in the cluster option (hereinafter "host utilization option") is set to a conservative setting of 60% by the option setting unit 304. In addition, other power management options, such as the power management aggressiveness threshold, are set to conservative settings, which in this example are default settings/values, by the option setting unit. Thus, the power management aggressiveness threshold option is set to a value of "1".

At 8:00 PM, the load has become very low as predicted, and thus, the host utilization option is set to the highest aggressive setting of 90% by the option setting unit 304. In addition, other power management options are set to the highest aggressive settings/values, e.g., the power management aggressiveness threshold option is set to a value of "5".

At 9:00 PM, the load still remains very low as predicted, and thus, the host utilization option is still set to the highest aggressive setting of 90% by the option setting unit 304. In addition, other power management options are still set to the highest aggressive settings/values, e.g., the power management aggressiveness threshold option is still set to a value of "5". These option settings/values will remain the same until 6:30 AM since the load will remain very low as predicted.

At 6:30 AM, the load is expected to increase in two and a half (2.5) hours, and thus, the host utilization option is lowered to a less aggressive setting of 80% by the option setting unit 304. In addition, other power management options are lowered from their highest aggressive settings/values to high aggressive settings/values, e.g., the power management aggressiveness threshold option is set to a value of "4".

At 7:00 AM, the load is expected to increase in two (2) hours, and thus, the host utilization option is further lowered to a less aggressive setting of 70% by the option setting unit 304. In addition, other power management options are lowered further from their high aggressive settings/values to medium aggressive settings/values, e.g., the power management aggressiveness threshold option is still set to a value of "3".

At 7:30 AM, the load is expected to increase in one and a half (1.5) hours, and thus, at least some of the power management options are further lowered to less aggressive settings/values. In this example, the host utilization option is unchanged. However, at least one of the other power management options is lowered further from their medium aggressive settings/values to low aggressive settings/values, e.g., the power management aggressiveness threshold option is still set to a value of "2".

At 8:00 AM, the load is expected to increase in one (1) hour, and thus, the host utilization option is lowered back to the conservative setting of 60% by the option setting unit 304. In addition, other power management options are lowered back to their conservative settings/values, e.g., the power management aggressiveness threshold option is still set to a value of "1".

At 9:00 AM, the load has increased as expected, and thus, the host utilization option is maintained at the conservative setting of 60% by the option setting unit 304. In addition, other power management options are maintained at their conservative settings/values. These option settings/values will remain the same until 8:00 PM when the load is expected to become very low.

As illustrated in the above example, the option setting unit 306 of the power management system 108 can gradually change the power management options of the power management analysis algorithm, which is executed by the power management engine 302, in anticipation of predicted load increase. Similar approach can be used to gradually change the power management options of the power management analysis algorithm in anticipation of predicted load decrease. However, the option changes should not be too drastic as to clip any resource demands of the clients in the clusters. By using the predicted resource demand data in an adaptive manner, the power management system can more efficiently perform power management operations.

Figure 4:
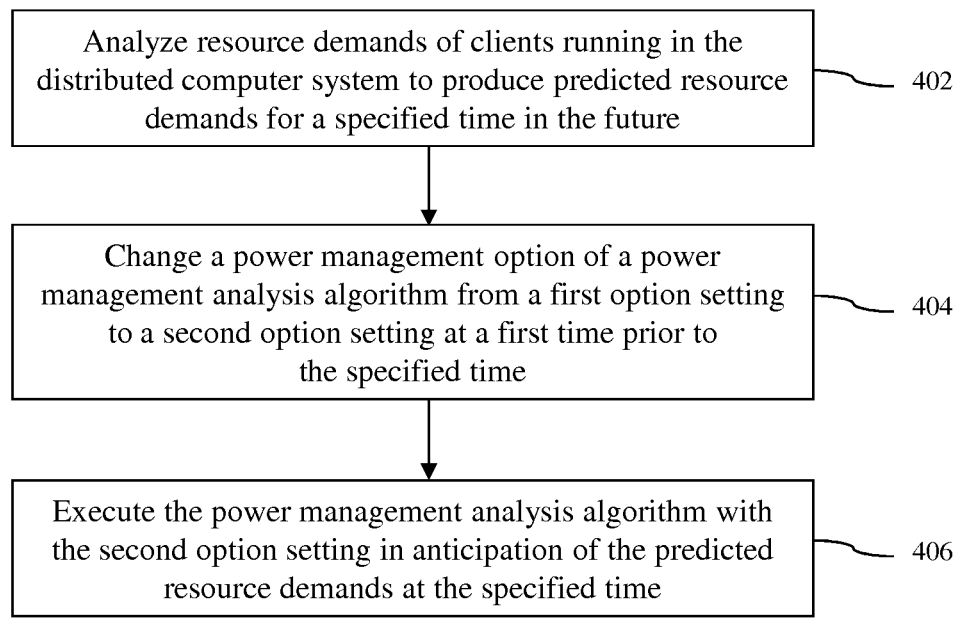
FIG. 4 is a flow diagram of a method for performing power management operations in a distributed computer system in accordance with an embodiment of the invention.

A method for performing power management operations in a distributed computer system in accordance with an embodiment of the invention is described with reference to a flow diagram of FIG. 4. At block 402, resource demands of clients, e.g., virtual machines, running in the distributed computer system are analyzed to produce predicted resource demands for a specified time in the future. At block 404, a power management option of a power management analysis algorithm is changed from a first option setting to a second option setting at a first time prior to the specified time. At block 406, the power management analysis algorithm with the second option setting is executed in anticipation of the predicted resource demands at the specified time.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing power management operations in a distributed computer system, the method comprising:
analyzing resource demands of clients running in the distributed computer system to produce predicted resource demands of the clients for a specified time in the future;
prior to providing at least one power management recommendation, automatically changing an option of a power management analysis algorithm from a first option setting to a second option setting at a first time prior to the specified time;
executing the power management analysis algorithm with the second option setting in anticipation of the predicted resource demands at the specified time, the power management analysis algorithm providing at least one power management recommendation on the distributed computer system; and
performing the at least one power management recommendation, including (a) switching the host computer to or from standby mode, or (b) powering off or powering on the host computer in the distributed computer system.

2. The method of claim 1, wherein the clients running in the distributed computer system are virtual machines and the resource demands are demands of virtualized resources.

3. The method of claim 1, wherein the analyzing the resource demands by the clients includes analyzing at least one of processor and memory demands of the clients running in the distributed computer system.

4. The method of claim 1, wherein the second option setting of the option is more aggressive with respect to power management than the first option setting.

5. The method of claim 1, wherein the second option setting of the option is less aggressive with respect to power management than the first option setting.

6. The method of claim 1, further comprising:
changing the option of the power management analysis algorithm from the second option setting to a third option setting at a second time subsequent to the first time and prior to the specified time; and
executing the power management analysis algorithm with the third option setting.

7. The method of claim 6, wherein the second option setting of the option is less aggressive with respect to power management than the first option setting and wherein the third option setting is less aggressive with respect to power management than the second option.

8. The method of claim 1, wherein the option of the power management analysis algorithm is an average host utilization in a cluster of host computers.

9. The method of claim 1, wherein the at least one power management recommendation includes one of migrating one of the clients to a different host computer in the distributed computer system and powering down or powering on a host computer in the distributed computer system.

10. A non-transitory computer-readable storage medium containing program instructions for performing resource management operations in a distributed computer system, wherein execution of the program instructions by one or more processors of a computer system causes the one or more processors to perform steps comprising:
analyzing resource demands of clients running in the distributed computer system to produce predicted resource demands of the clients for a specified time in the future;
prior to providing at least one power management recommendation, automatically changing an option of a power management analysis algorithm from a first option setting to a second option setting at a first time prior to the specified time;
executing the power management analysis algorithm with the second option setting in anticipation of the predicted resource demands at the specified time, the power management analysis algorithm providing at least one power management recommendation on the distributed computer system; and
performing the at least one power management recommendation, including (a) switching the host computer to or from standby mode, or (b) powering off or powering on the host computer in the distributed computer system.

11. The non-transitory computer-readable storage medium of claim 10, wherein the clients running in the distributed computer system are virtual machines and the resource demands are demands of virtualized resources.

12. The non-transitory computer-readable storage medium of claim 10, wherein the analyzing the resource demands by the clients includes analyzing at least one of processor and memory demands of the clients running in the distributed computer system.

13. The non-transitory computer-readable storage medium of claim 10, wherein the second option setting of the option is more aggressive with respect to power management than the first option setting.

14. The non-transitory computer-readable storage medium of claim 10, wherein the second option setting of the option is less aggressive with respect to power management than the first option setting.

15. The non-transitory computer-readable storage medium of claim 10, wherein the steps further comprise:
changing the option of the power management analysis algorithm from the second option setting to a third option setting at a second time subsequent to the first time and prior to the specified time; and
executing the power management analysis algorithm with the third option setting.

16. The non-transitory computer-readable storage medium of claim 15, wherein the second option setting of the option is less aggressive with respect to power management than the first option setting and wherein the third option setting is less aggressive with respect to power management than the second option.

17. The non-transitory computer-readable storage medium of claim 10, wherein the option of the power management analysis algorithm is an average host utilization in a cluster of host computers.

18. A power management system supported by hardware in a distributed computer system comprising:
an analytics engine configured to analyze resource demands of clients running in the distributed computer system to produce predicted resource demands of clients for a specified time in the future;
an option setting unit configured to, prior to providing at least one power management recommendation, automatically change an option of a power management analysis algorithm from a first option setting to a second option setting at a first time prior to the specified time; and
a power management engine configured to execute the power management analysis algorithm with the second option setting in anticipation of the predicted resource demands at the specified time, the power management analysis algorithm providing at least one power management recommendation on the distributed computer system,
wherein the power management system is configured to perform the at least one power management recommendation, including (a) switching the host computer to or from standby mode, or (b) powering off or powering on the host computer in the distributed computer system.

19. The power management system of claim 18, wherein the clients running in the distributed computer system are virtual machines and the resource demands are demands of virtualized resources.

20. The power management system of claim 18, wherein the analytics engine is configured to analyze at least one of processor and memory demands of the clients running in the distributed computer system.

21. The management server of claim 18, wherein the second option setting of the option is more aggressive with respect to power management than the first option setting.

22. The power management system of claim 18, wherein the second option setting of the option is less aggressive with respect to power management than the first option setting.

23. The power management system of claim 18, wherein the option setting unit is further configured to change the option of the power management analysis algorithm from the second option setting to a third option setting at a second time subsequent to the first time and prior to the specified time and wherein the power management engine is configured to execute the power management analysis algorithm with the third option setting.

24. The power management system of claim 23, wherein the second option setting of the option is less aggressive with respect to power management than the first option setting and wherein the third option setting is less aggressive with respect to power management than the second option.

* * * * *